United States Patent Office 3,362,643
Patented Jan. 9, 1968

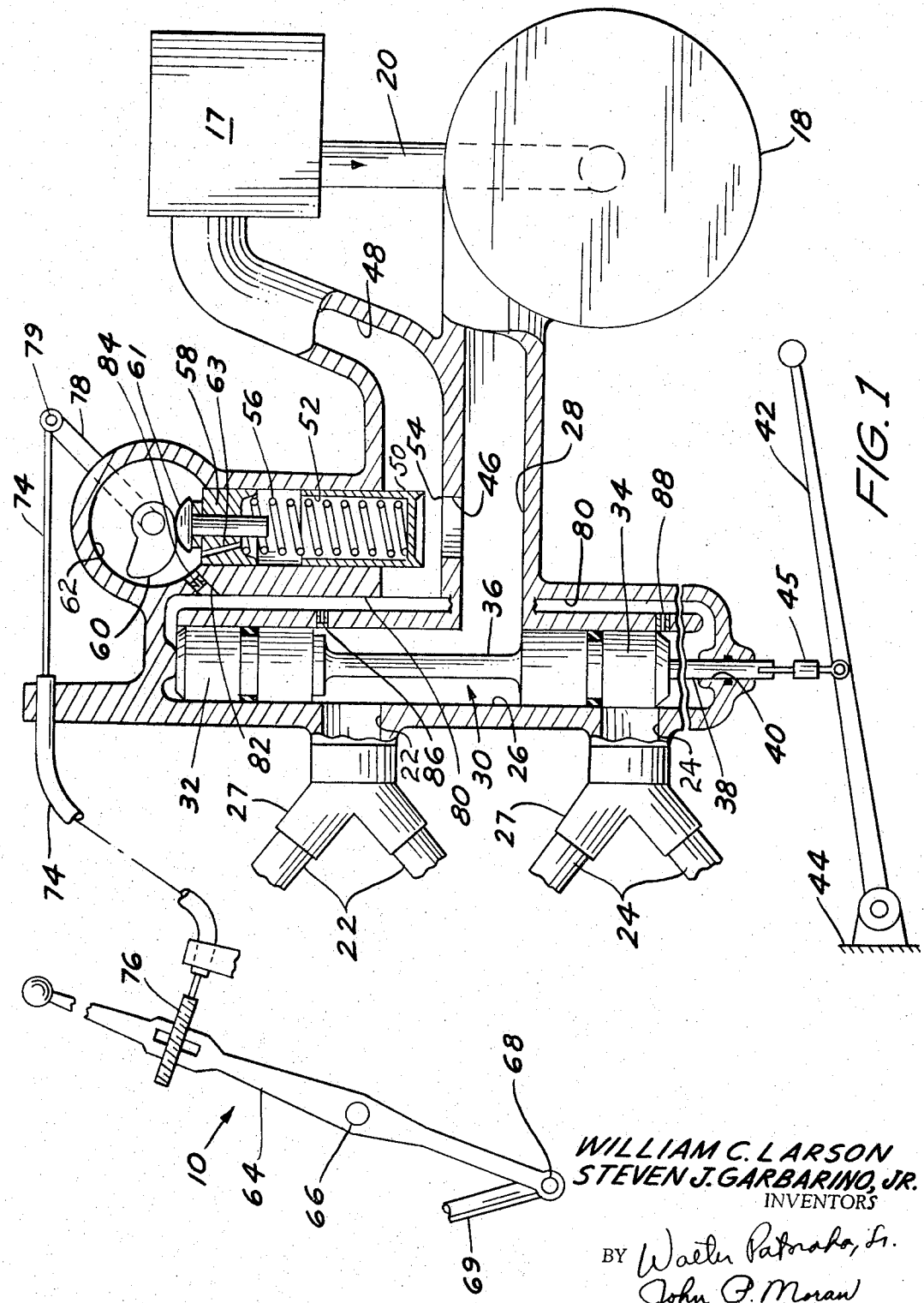

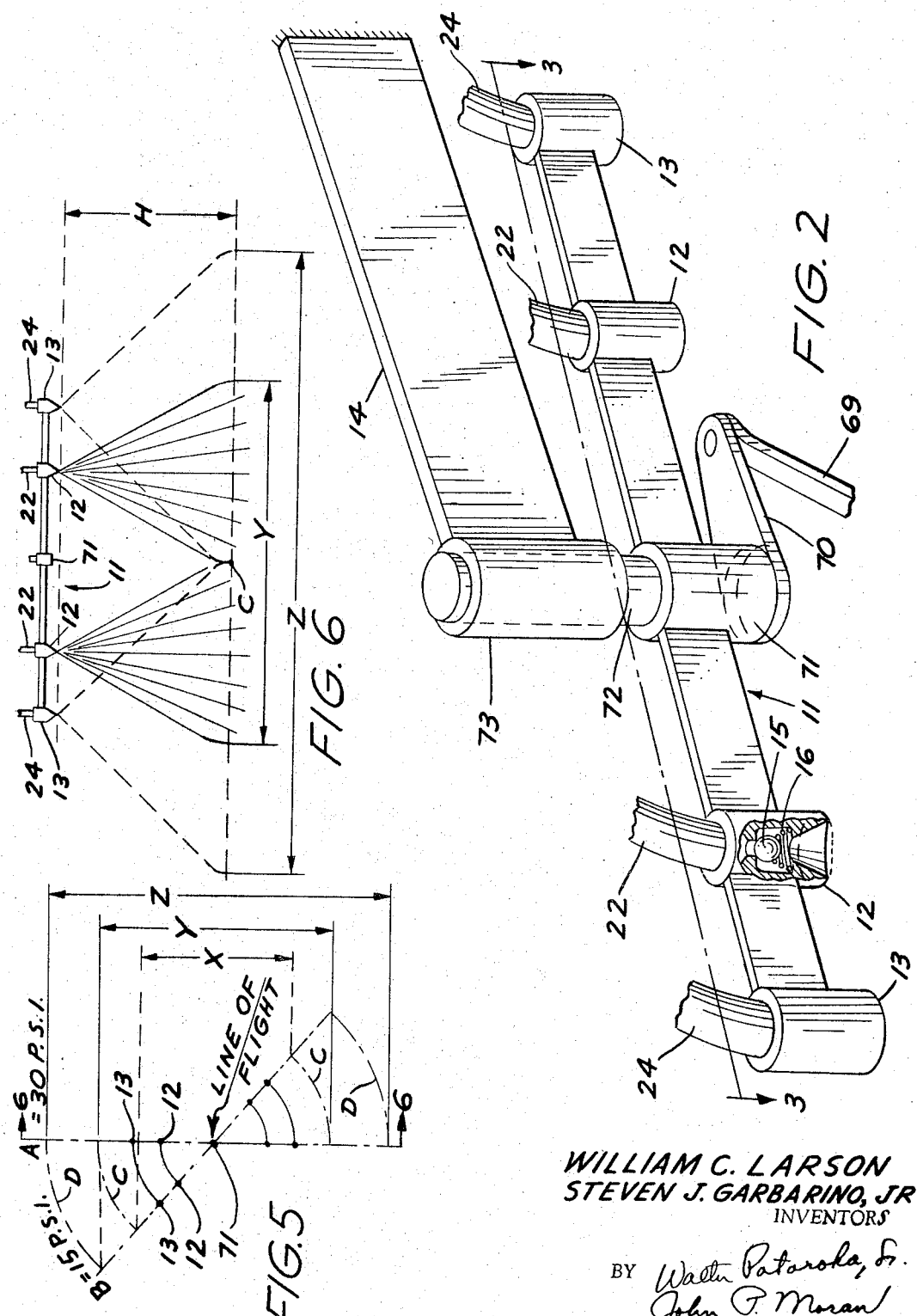

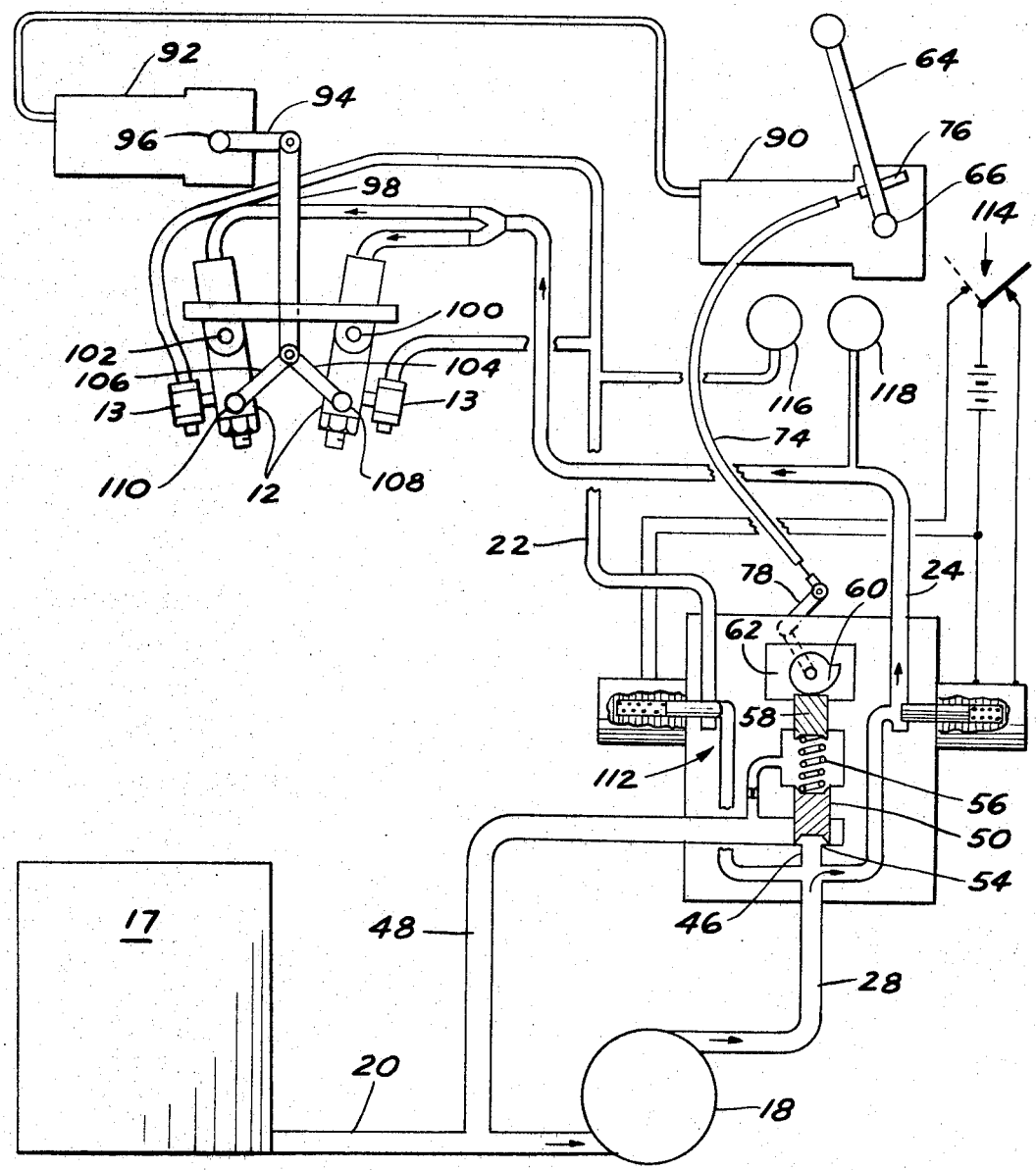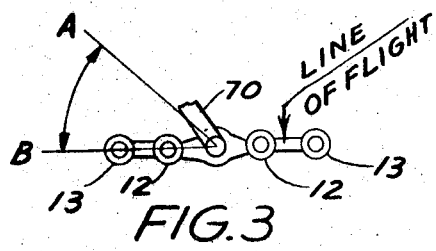

3,362,643
FLUID SUPPLY SYSTEM INCLUDING MEANS FOR CHANGING FLUID PRESSURE IN RESPONSE TO NOZZLE ROTATION
William C. Larson and Steven J. Garbarino, Jr., Utica, Mich., assignors to Holley Carburetor Company, Warren, Mich., a corporation of Michigan
Filed Sept. 27, 1965, Ser. No. 495,756
17 Claims. (Cl. 239—169)

ABSTRACT OF THE DISCLOSURE

This application discloses a remotely controlled fluid supply system particularly adapted for spraying chemicals along relatively narrow rights-of-way from an airplane or other vehicle, and comprising a remotely controlled nozzle and fluid flow system, including a nozzle arrangement with manually operated linkage connected thereto for rotating the nozzle arrangement in order to change the spray width, a fluid reservoir, a pump for supplying fluid from the reservoir to the nozzle arrangement, and a by-pass system that changes the fluid pressure in response to rotation of the nozzle arrangement, so as to maintain the same concentrated areal dosage regardless of the width of the path being sprayed.

---

This invention relates generally to remotely controlled fluid supply systems, and more particularly to a remotely controlled nozzle and fluid flow system particularly adapted for spraying chemicals along relatively narrow railroad rights-of-way, electrical transmission lines through inaccessible areas, and the like, from a moving vehicle such as a helicopter.

While spraying chemicals in that manner for the purpose of keeping the area free of vegetation is old, a need has arisen for a spray system capable of adjustment to vary the width of the swath or path being sprayed and to automatically maintain constant the amount of chemical sprayed per unit ground area regardless of the width of the path, assuming a constant vehicle speed, so as to limit the application of the chemical to the area desired to be sprayed and prevent waste of the chemical by limiting the application thereof to the amount required.

Accordingly, a general object of the invention is to provide a system that will accomplish the above mentioned requirements.

A further object of the invention is to provide such a system wherein the swath width and spray pressure may be simultaneously varied in order to maintain a constant density of coverage.

Still another object of the invention is to provide such a system which includes a plurality of nozzles and means for rotating the nozzles in order to change the spray width, while automatically regulating the fluid pressure.

A further object of the invention is to provide such a system which includes the above mentioned nozzle arrangement and a bypass system that changes the fluid pressure in response to rotation of the nozzle arrangement.

A still further object of the invention is to provide an additional set (or sets) of nozzles which may be used in lieu of the above mentioned set of nozzles to spray a wider path at a particular pressure setting.

An additional object of the invention is to provide such a system wherein a manually controlled valve is used to select a particular set (or sets) of nozzles, depending upon the swath width desired to be sprayed.

A still further object of the invention is to provide such a system which may be mechanically or hydraulically operated.

A still further object of the invention is to provide such a system which is adaptable for use with any type of pump.

An additional object of the invention is to provide such a system wherein means are provided for adjusting the initial position of the bypass valve, without rotating the selected nozzles, in order to properly coordinate the fluid pressure operating range with the ideal corresponding maximum swath width range.

Other objects and advantages of the invention will become more apparent when reference is made to the following specification and the accompanying drawings wherein:

FIGURE 1 is a schematic illustration in partial cross-section of a portion of a system embodying the invention;

FIGURE 2 is a schematic illustration in partial cross-section of the remaining portion of a system embodying the invention;

FIGURE 3 is a cross-sectional view taken along the plane of line 3—3 of FIGURE 2 and looking in the direction of the arrows;

FIGURE 4 is a schematic illustration of a modification of the invention;

FIGURES 5 and 6 are graphical representations of a feature of the invention, FIGURE 6 being a view along the plane of line 6—6 of FIGURE 5 and looking in the direction of the arrows.

Referring now to the drawings in greater detail, FIGURES 1 and 2 taken together are schematic illustration of a remote control spray system 10, including inner and outer sets of nozzles, 12 and 13, respectively, the two sets of nozzles being arranged in a nozzle assembly 11 that is aligned and rotatably mounted in a fixed support 14, as illustrated in FIGURE 2. Each of the nozzles 12 and 13 includes a check valve 15 (FIGURE 2). The valves 15 of the nozzles are urged closed by springs 16. The spray system 10 further includes a fluid reservoir 17, means such as a pump 18 (which may be a centrifugal pump, a vane type positive displacement pump or any other type of pump) for supplying fluid pressure, and a conduit 20 communicating therebetween.

Flexible conduits 22 and 24 communicate between the inner and outer sets of nozzles, respectively, and a central chamber 26 in any suitable manner, such as by means of Y-shaped fittings 27. It is recognized, of course, that other conduit systems, such as a concentric system, could be employed. Still another conduit 28 communicates between the central chamber 26 and the pump 18. A two-diameter selector valve 30 is slidably mounted in the central chamber 26, the selector valve 30 being formed to include large diameter ends 32 and 34 connected by a smaller diameter portion 36. A stem 38 extends from the outer end of the portion 34 and through an opening 40 formed in one end of the central chamber 26. A lever 42 is pivotally mounted at one end thereof on a fixed abutment 44 and is pivotally connected at an intermediate point thereof to an extension 45 of the stem 38, for a purpose to be described later.

Passage 46 communicates between the conduit 28 and another conduit 48 which leads back to the reservoir 17. A bypass valve 50 is slidably mounted in a cylindrical passageway 52, the latter intersecting the conduit 48 at a point just opposite the opening 54 of the passage 46 into the conduit 48. A spring 56 urges the valve 50 downwardly in FIGURE 1 across the conduit 48 and toward the opening 54, the latter serving as a valve seat for a purpose to be described. The upper end 58 (FIGURE 1) of the valve 50 is retained in a variable fixed position, depending upon the position of a cam 60 which is rotatably mounted in an adjoining chamber 62 to engage the top projection 61 of the end 58. An opening 63 through the end member 58 communicates between the chamber 62 and the passageway 52, intermediate the ends of the valve 50.

A manually controlled lever 64 is pivotally mounted at an intermediate point thereof on a fixed pivot pin 66. One end 68 of the lever 64 is pivotally connected to one end of a linkage member 69, the other end of which is pivotally connected to still another linkage member 70. As better illustrated in FIGURE 2, the member 70, has one end thereof fixedly secured to the member 71 of the assembly 11 including the two sets of nozzles 12 and 13. The lever 70 is thus capable of rotating the nozzle assembly 11 through some angle A–B, say 45°, about a pin 72 secured to the member 71 and rotatable within a bushing 73 formed on the fixed support 14.

Another linkage member 74 is secured to the lever 64 for movement therewith. A screw arrangement 76 makes possible the adjustment of the precise connection between the linkage member 74 and the lever 64, for a purpose to be described. Still another linkage member 78 is pivotally connected at its one end to an end of the member 74 about a movable pivot pin 79 and at its other end to the cam 60.

A passage 80, communicating between the outer ends of the larger diameter portions 32 and 34 of the selector valve 30, also communicates with the return conduit 48. A passage 82, including a fixed restriction 84 communicates between the passage 80 and the cam chamber 62, and restricted openings 86 and 88 communicate between the passage 80 and the central chamber 26.

*Operation*

As previously stated, the remote control spray system 10 could be mounted in any vehicle, such as a helicopter, and used to spray a vegetation or other control chemicals over a predetermined path width along a railroad right-of-way or a transmission line, for example. As may be noted in FIGURE 2, the four nozzles are aligned; however, only the inside set 12, or the outside set 13, may be operating at any particular time.

It will be noted from FIGURE 1 that movement of the lever 42 would slide the valve 30 within the chamber 26. Moving the lever 42 in its central "shut off" position causes the large diameter ends 32 and 34 to completely block off both the conduits 22 and 24 which lead to the nozzles 12 and 13, respectively. An upward movement (FIGURE 1) of the lever 42 would raise the valve 30, thereby permitting fluid from the conduit 28 to flow into the conduit 22 via the space around the small diameter portion 36. While this communication is being established, the conduit 24 would remain closed off, by virtue of the upward movement of the end 34 toward the conduit 28. Obviously, if the lever 42 were moved downwardly in FIGURE 1, to its extreme position past the shut off position, the conduit 22 would be closed off and the conduit 24 would be opened to fluid from the conduit 28, thereby bringing the nozzles 13 into operation. The spring-loaded valves 15 serve to prevent leakage after the changeover from one nozzle arrangement to the other is made.

Whether the nozzles 12 or the nozzles 13 are selected depends upon the maximum width of the area sought to be sprayed. Experience indicates that nozzles, such as the nozzles 12 and 13, are most efficient when the fluid flowing therethrough is between certain pressure limits, say 15 and 30 p.s.i. Tests have indicated that using a 30 p.s.i. pressure with the nozzles in position A (FIGURE 5) produces the same concentrated coverage as using a 15 p.s.i. pressure with the nozzles in position B; obviously, however, the width of coverage is substantially greater in position A, which is substantially perpendicular to the line of flight.

As illustrated in FIGURE 5, either nozzles 12 or 13 may be selected, producing a spray width range of X to Y for nozzles 12 and a greater spray width range of Y to Z for nozzles 13. In other words, the outer edge of the spray from nozzles 12 would move through arcs C, while the outer edge of the spray from nozzles 13 would move through arcs D. Hence, the maximum spray width of nozzles 12 would occur with the nozzles 12 in position A and the minimum spray width of nozzles 13 would occur with the nozzles 13 in position B, and, as illustrated, these respective widths would be the same. Hence, rotating nozzles 12 toward position B from A would produce a lesser spray width, while rotating nozzles 13 toward A from B would produce a greater width than the common width Y just discussed.

FIGURE 6, which is a schematic illustration taken along the plane of line 6—6, position A, of FIGURE 5, illustrates the manner in which the material sprayed by the nozzles 12 (or 13) covers the maximum width Y (or Z). It should be realized that the nozzles 12 or 13 are of such a design that the spray emitting therefrom is in the form of a triangular sheet, rather than in the form of a regular cone; in other words, the exit opening (see FIGURE 2) is slotted, rather than round in shape. The nozzles are further designed such that the shape of the cone resulting from spray through nozzles 12 and 13 includes different angles, the result being that the inner edges of the spray from any set of nozzles, at the widest point thereof, meets at the central point C. Depending, at least in part, upon the material being sprayed, the vehicle carrying the nozzle assembly 11 must be traveling at some minimum predetermined altitude H, for example, 50 feet, in order that the full spray widths may be realized and that there not be a gap therebetween at the center C. Once the material has been projected in a triangular path downwardly through the distance H, it will thereafter free-fall in a vertical attitude, as illustrated.

Once the swath width is known and the selector lever 42 is set for the appropriate set of nozzles, as described above, then, rotation of the nozzle assembly is accomplished by pivoting the lever 64 about the pin 66, causing the linkages 69 and 70 to rotate the nozzle assembly 11, between A and B, about the axis of a central pivot post 73 until the exact desired spray width is established.

It may be noted from FIGURE 1 that movement of the lever 64 to the right, causing the nozzle assembly 11 to rotate from position A toward position B, results in a corresponding rightward movement of the levers 74 and 78, causing clockwise rotation of the cam 60, within the chamber 62. This will serve to relax the downward tension on the upper valve member 58 and the spring 56, thereby permitting the force of the fluid in the conduit 28 to raise the valve 50 off the seat 54, bypassing some of the fluid from the conduit 28 to the reservoir 17 through the conduit 48. It is in this manner that, while the nozzles 12 and 13 are being rotated between positions B and A, pressure in the conduits 28, and either 22 or 24, will be automatically regulated between 15 and 30 p.s.i., producing a constant areal coverage on the ground.

Referring once again to FIGURE 6, it should be realized that the particular triangular spray from either the nozzles 12 or the nozzles 13 will remain constant regardless of the pressure in the lines 22 and 24. Varying the pressure from 15 to 30 p.s.i. will not change the angle of the triangle or the length of the outer edges of the triangle, but, rather, will merely change the concentration of the solution being sprayed. Satisfactory results have been attained while using a material consisting of a mixture of Tordon and Norbac, both manufactured by Dow Chemical Company.

Since the length of the chamber 52 between the ends of the valve 50 may vary as the valve end 58 moves upwardly, fluid may be displaced through the opening 63 into the chamber 62, and thence through the opening 82 into the return lines 80 and 48.

The restricted openings 86 and 88 between the selector valve chamber 26 and the return passage 80 are necessary only when the pump 18 is a continually running centrifugal type. In that event, the operator would return the selector valve 30 to a central position, blocking off flow through the conduits 22 and 24, whenever spraying was not desired. Then, any leakage past the ends 32 and 34 would flow through the restrictions 86 and 88 and return to the reservoir 17 via the passages 80 and 48. When the pump 18 consists of a vane type or other positive displacement pump which shuts off whenever the system 10 is not being used, the restrictions 86 and 88 are not needed. It may be noted that the passage 80 also permits the displacement of fluid from the ends of the members 32 and 34 of the selector valve 30, as the latter moves up or down in the chamber 26.

While FIGURE 1 illustrates a mechanical linkage between lever 64 and the nozzles 12 and 13, a hydraulic control system could be used in lieu thereof, as illustrated in FIGURE 4. The hydraulic system of FIGURE 4 may consist of suitable servo and slave hydraulic piston controls 90 and 92, respectively, which may be purchased as standard items, from various sources, such as Sperry Products, Inc., Danbury, Conn. These devices are constructed in a manner so that movement of the piston (not shown) inside the control 90 by lever 64 will produce a corresponding movement of the piston within the control 92. The latter movement will serve to pivot a linkage member 94 about point 96, thereby causing a connecting member 98 to either raise or lower.

It may be noted in FIGURE 4 that this vertical movement will cause the nozzles 12 and 13 to either pivot toward one another or away from one another about pivot pins 100 and 102, by virtue of the pivotal movement of linkage members 104 and 106, the latter members being pivotally connected to the nozzles at pivot points 108 and 110. It can be realized that, as the nozzles are being pivoted, the pressure of the fluid flowing therethrough will have changed as a result of the simultaneous rotation of the cam 60 on the bypass valve 50/58 through linkage members 74 and 78. Hence, the width of the spray cone from each of the two nozzles will have changed, thereby changing the width of the path or swath being sprayed, without appreciable overlap at the center thereof and without having to rotate the nozzle assembly, as was the case in the FIGURE 2 embodiment.

FIGURE 4 also illustrates that, in lieu of the one-piece selector valve 30, a two-piece solenoid arrangement 112 may be employed, wherein the alternate opening and closing of conduits 22 and 24 may be controlled electrically, as through a switch system 114. Otherwise, the elements of FIGURE 4 are very similar to the corresponding elements of FIGURES 1 and 2 and are similarly identified. Pressure gauges 116 and 118 may be employed in conjunction with the conduits 22 and 24, respectively, to facilitate adjusting the position of the cam 60 by means of the adjustment screw 76, in order to retain the pressure limits at 15 and 30 p.s.i. The screw 76 may also serve the additional purpose of making possible a change of pressures at a particular path width. In other words, if successive sections to be sprayed are covered with weeds of different density, it may be desirable to spray the first 25 foot width, for example, at a low pressure within the pressure limits and the succeeding 25 foot width at a higher pressure within the limits, in order to concentrate more heavily on the thicker brush. Such a variation is possible by changing the setting of the screw 76 and thereby changing the setting of the cam 60. It is contemplated that a separate pressure or "dosage" gauge could be coordinated with the setting of the screw 76, in order to quickly permit the operator to change to a desired setting.

It should be apparent from the above discussion that the invention includes a novel means for varying the width of a path being sprayed while maintaining a set concentrated dosage on the area covered, the latter feature not being heretofore available in such apparatus.

It should also be apparent that, an additional feature is that of being able to utilize some one of several sets of spray nozzles, thereby increasing the range of path widths which may be sprayed.

While but two embodiments of the invention have been shown and described, it is apparent that other modifications of the invention are possible within the scope of the appended claims.

What we claim as our invention is:

1. A remote control portable spray system, comprising a set of nozzles, means for supplying fluid under pressure to said set of nozzles, and means operatively connected to said set of nozzles for simultaneously rotating said set of nozzles and varying the pressure of the fluid being supplied thereto, so as to maintain the same concentrated areal dosage regardless of the width of the path being sprayed.

2. A remote control portable spray system comprising a nozzle arrangement, means for supplying fluid under pressure to said nozzle arrangement, and means operatively connected to said nozzle arrangement for simultaneously rotating said nozzle arrangement and varying the pressure of the fluid being supplied thereto, so as to maintain the same concentrated areal dosage regardless of the width of the path being sprayed.

3. A remote control portable spray system, comprising a set of nozzles, means for supplying fluid under pressure to said set of nozzles, means operatively connected to said set of nozzles for simultaneously rotating said set of nozzles and varying the pressure of the fluid being supplied thereto, thereby maintaining the same concentrated areal dosage regardless of the width of the path being sprayed, and additional means operatively connected to said set of nozzles for at times regulating said dosage at a particular path width.

4. A remote control spray system, comprising a set of nozzles, a fluid reservoir, means for supplying fluid under pressure from said fluid reservoir to said set of nozzles, means operatively connected to said set of nozzles for repositioning said set of nozzles in order to change the width of the path being sprayed, means movable in response to movement of said first mentioned means for varying the pressure of the fluid being supplied to said set of nozzles so as to maintain the same concentrated dosage on any area traversed by the particular path width being sprayed and additional manually adjustable means operatively connected to said first mentioned means for varying the dosage being applied to any particular path width.

5. A remote control spray system, comprising a set of nozzles, a fluid reservoir, a source of pressure for supplying fluid from said fluid reservoir to said set of nozzles, means operatively connected to said set of nozzles for rotating said set of nozzles in order to change the width of the path being sprayed, and means movable in response to movement of said first mentioned means for varying the pressure of the fluid being supplied by said source of pressure to said set of nozzles, so as to maintain the same concentrated dosage on any area traversed by the particular path width being sprayed.

6. The device described in claim 5 including, additionally, a second set of nozzles and additional means for changing the flow of fluid from the first set of nozzles to the second set of nozzles.

7. The device described in claim 5 including, additionally, a plurality of sets of nozzles and additional means for changing the flow from one of said sets of nozzles to another.

8. The device described in claim 5, wherein the first mentioned means includes a manual lever and linkage means connected between said manual lever and said set of nozzles.

9. The device described in claim 5, wherein said second mentioned means includes a bypass valve operatively connected to said source of pressure, a cam for varying the opening of said bypass valve, and linkage means connected between said cam and said first mentioned means.

10. The device described in claim 5, wherein said first-mentioned means includes a manual lever and linkage means connected between said manual lever and said set of nozzles, and said second mentioned means includes a bypass valve operatively connected to said source of pressure, a cam for varying the opening of said bypass valve, and linkage means connected between said manual lever and said cam.

11. The device described in claim 5, wherein each nozzle of said set of nozzles is constructed so that the spray pattern thereof is in the form of a triangular sheet, said spray pattern remaining constant regardless of the pressure of the fluid supplied to said nozzles.

12. The device described in claim 6, wherein said additional means includes first and second passages communicating between said source of pressure and said first and second set of nozzles, respectively, a selector valve for alternately blocking off the flow through either the first or second passage, and a manually operable lever pivotally connected to said selector valve.

13. The device described in claim 6, wherein said additional means includes first and second passages leading from said first and second set of nozzles, respectively, a third passage leading from said source of pressure, a chamber formed at the junction between said first, second and third passages, a two-diameter selector valve slidably mounted in said chamber for alternately blocking off the flow from said third passage to either the first or second passage, and a manually operated lever pivotally connected to said selector valve.

14. A remote control spray system comprising a nozzle arrangement, a fluid reservoir, a source of pressure for supplying fluid from said fluid reservoir to said nozzle arrangement, means operatively connected to said nozzle arrangement for rotating said nozzle arrangement in order to change the width of the path being sprayed, and means movable in response to movement of said first mentioned means for varying the pressure of the fluid being supplied by said source of pressure to said nozzle arrangement, so as to maintain the same concentrated dosage on any area traversed by the particular path width being sprayed.

15. The device described in claim 14 including, additionally, a second nozzle arrangement and additional means for changing the flow of fluid from the first nozzle arrangement to the second nozzle arrangement.

16. The device described in claim 14, wherein the first mentioned means includes a manual lever and hydraulic means operatively connected between said manual lever and said nozzle arrangement.

17. The device described in claim 15, wherein said additional means includes first and second passages communicating between said source of pressure and said first and second set of nozzles, respectively, a pair of solenoid actuated valves for alternately blocking off the flow of fluid through either the first or second passages, and electrical means for operating said solenoid actuated valves.

References Cited

UNITED STATES PATENTS

| | | | |
|---|---|---|---|
| 1,272,070 | 7/1918 | Macnicol | 239—97 |
| 1,990,355 | 2/1935 | Tierney | 239—587 X |
| 2,022,396 | 11/1935 | Wiederhold | 239—98 |
| 2,780,488 | 2/1957 | Kennedy | 239—97 |
| 3,084,890 | 4/1963 | Hyde | 239—171 X |
| 3,236,456 | 2/1966 | Ackley et al. | 239—170 X |

FOREIGN PATENTS 703,612  2/1954  Great Britain.

M. HENSON WOOD, JR., *Primary Examiner.*

VAN C. WILKS, *Examiner.*